March 4, 1969     O. BADER ET AL     3,430,436
ENGINE VALVE BRAKE FOR AN INTERNAL COMBUSTION ENGINE PROVIDED
WITH AN EXHAUST GAS TURBO-SUPERCHARGER
Filed Jan. 24, 1967
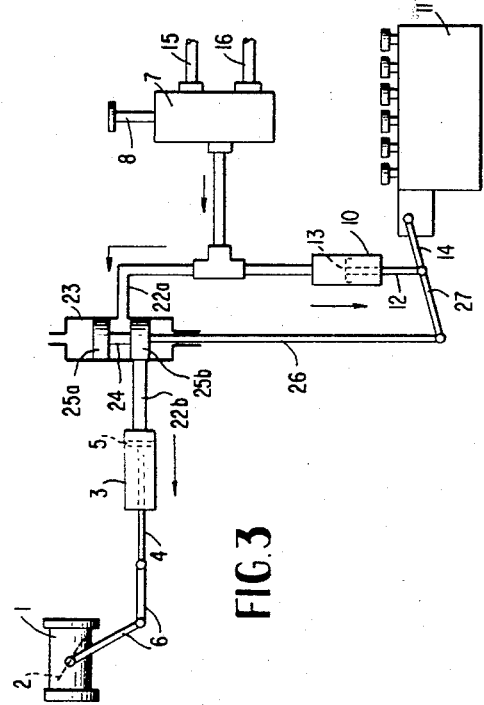
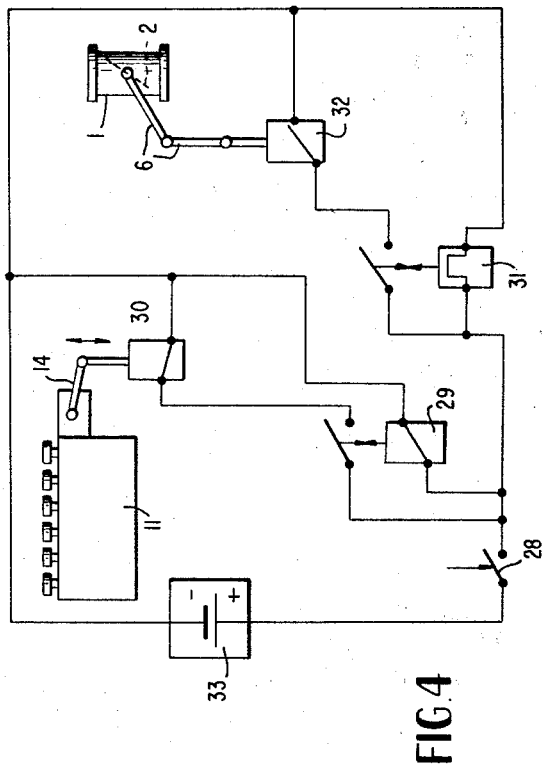
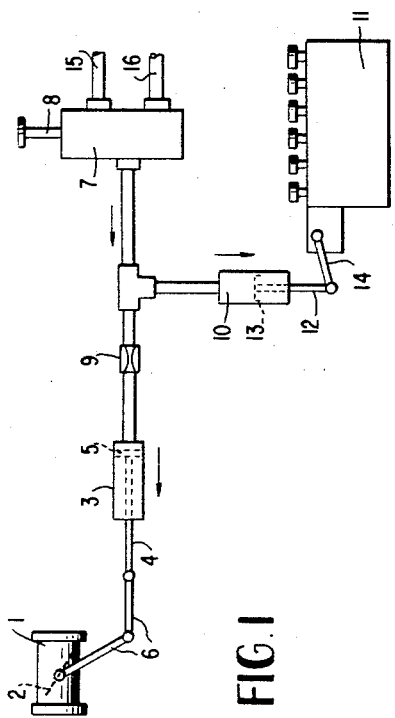
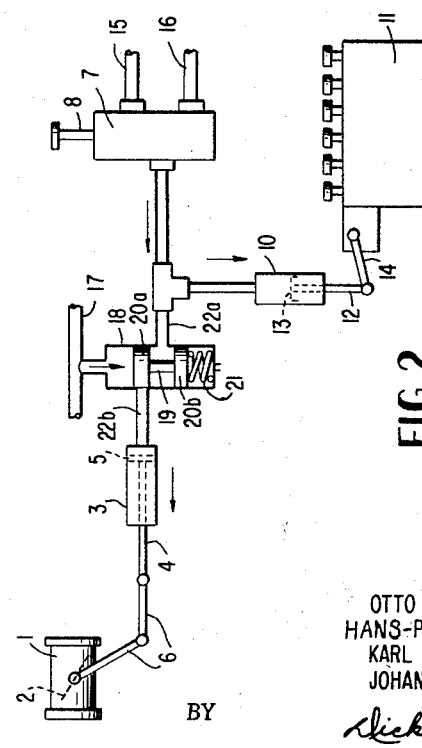
INVENTOR
OTTO BADER
HANS-PETER GÜHNE
KARL SOMMERFELD
JOHANNES CHILLA
BY Dicke & Craig
ATTORNEYS

United States Patent Office 3,430,436
Patented Mar. 4, 1969

3,430,436
ENGINE VALVE BRAKE FOR AN INTERNAL COMBUSTION ENGINE PROVIDED WITH AN EXHAUST GAS TURBO-SUPERCHARGER
Otto Bader, Stuttgart-Bad Cannstatt, Hans-Peter Guhne and Karl Sommerfeld, Fellbach, Wurttemberg, and Johannes Chilla, Stuttgart-Bad Cannstatt, Germany, assignors to Daimler-Benz Aktiengesellschaft, Stuttgart-Unterturkheim, Germany
Filed Jan. 24, 1967, Ser. No. 611,391
Claims priority, application Germany, Jan. 26, 1966, D 49,216
U.S. Cl. 60—13     9 Claims
Int. Cl. F02d 9/06

ABSTRACT OF THE DISCLOSURE

An actuating mechanism for actuating the brake valve of an engine valve brake used in connection with a supercharged internal combustion engine having an exhaust-gas turbo-supercharger, in which the closing of the brake valve by its actuating mechanism is delayed until after the supply of fuel from the injection pump to the internal combustion engine is turned off. In case of use of a fluid pressure medium for the actuating mechanism a throttle may be used as delay element or, in the alternative, a double-piston actuated either in response to the pressure in the line from the supercharger to the internal combustion engine or in dependence in the position of the control rack of the injection pump may be used as delay element. In the event of an electric control circuit for the actuation of the brake valve, a delay relay may be used as delay element.

Background of the invention

The present invention relates to an engine brake, and more particularly to an engine valve brake having a valve located in the exhaust gas line of an internal combustion engine which includes an exhaust-gas turbocharger.

With an internal combustion engine provided with an exhaust-gas turbo-supercharger, care must be taken that during operation the pump limit of the exhaust-gas turbo-supercharger is not exceeded. A pumping, i.e., a labile and unsteady operation of the supercharger occurs as soon as a predetermined pressure is exceeded in the line leading from the supercharger to the internal combustion engine by reason of smaller air input by or absorption on the part of the internal combustion engine. Damages may be caused at the supercharger and at the pipe lines or conduits due to change from laminar to turbulent flow occurring during pumping of the supercharger. In order to avoid a pumping of the supercharger, the air quantity supplied by the supercharger has to be matched to the prevailing input capacity of the internal combustion engine, i.e., to its rate of charging air flow. This means that in the diagram of a supercharged internal combustion engine provided with an exhaust gas turbocharger, in which there is plotted along the ordinate the charging pressure ratio, i.e., the ratio of the pressure downstream of the supercharger to the pressure upstream of the supercharger, and along the abscissa the volume of air flow, the absorption line of the internal combustion engine, i.e., the rate of charging air flow through the engine with a constant rotational speed in dependence on the supercharger pressure ratio, always has to lie to the right of the pump limit of the supercharger.

If an internal combustion engine provided with an exhaust-gas turbo-charger is provided with an engine valve brake, then upon closure of the brake valve arranged in the exhaust-gas line upstream of the supercharger the absorption or input curve of the engine is displaced toward the left in the aforementioned diagram. If now the supply of the injection pump is turned off and the brake valve is closed simultaneously, then it may happen with a relatively high supercharger pressure ratio that the supercharger operates temporarily within a region which lies to the left the pump limit of the supercharger in the diagram of the internal combustion engine. However, even such a temporary pumping of the supercharger may already lead to damages at the supercharger itself and at the conduits or pipe lines.

Summary of the invention

For purposes of avoiding this disadvantage, it is proposed according to the present invention, with an internal combustion engine for motor vehicles which is equipped with an injection pump, an engine valve brake and an exhaust-gas turbo-supercharger, to build into the actuating mechanism for the engine valve brake a delay means of any suitable construction which delays the closing of the brake valve of the engine valve brake until after the turning off of the supply of the injection pump.

With pneumatic or hydraulic actuating mechanisms of the engine valve brake, a throttle may be utilized as delay means, or the control of the brake valve can take place in dependence on the position of the control rack of the injection pump or in dependence on the pressure in the pipe line leading from the exhaust-gas turbo-charger to the engine.

With an electric actuating mechanism of the engine valve brake, a conventional delay relay may be provided as delay means.

Accordingly, it is an object of the present invention to provide an improved engine valve brake for an internal combustion engine having an exhaust-gas turbo-supercharger, which avoids by extremely simple and effective means the aforementioned shortcomings and drawbacks encountered with the prior art arrangements.

Another object of the present invention resides in an engine valve brake for a supercharged internal combustion engine utilizing an exhaust-gas turbo-supercharger in which pumping of the compressor or supercharger is effectively prevented under all operating conditions.

A further object of the present invention resides in a control system for actuating an engine valve brake of an internal combustion engine having an exhaust-gas turbo-supercharger which is so constructed and arranged as to minimize the danger of damage to the supercharger and/or the lines leading from the supercharger to the engine due to unstable operation of the supercharger.

A still further object of the present invention resides in an engine valve brake for an internal combustion engine provided with an exhaust-gas turbo-supercharger which offers greater reliability of operation under all operating conditions and assures greater length of life of the various parts thereof.

These and further objects, features, and advantages of the present invention will become more obvious from the following description when taken in connection with the accompanying drawing which shows, for purposes of illustration only, several embodiments in accordance with the present invention, and wherein:

FIGURE 1 is a schematic view of a hydraulic or pneumatic actuating mechanism for an engine valve brake in accordance with the present invention provided with a throttle as delay element;

FIGURE 2 is a schematic view of a modified embodiment of a hydraulic or pneumatic actuating mechanism for an engine valve brake in accordance with the present invention, in which the delayed closure of the brake valve takes place in dependence on the pressure in the line leading from the exhaust-gas turbo-supercharger to the engine;

FIGURE 3 is a schematic view of a still further modified embodiment of a hydraulic or pneumatic actuating mechanism for a brake valve in accordance with the present invention in which the control of the closure movement of the brake valve takes place in dependence on the position of the control rack of the injection pump; and FIGURE 4 is a schematic diagram of still another embodiment of an electric actuating mechanism for an engine valve brake in accordance with the present invention in which a delay relay is provided as delay element.

Referring now to the drawing wherein like reference numerals are used throughout the various views to designate like parts, and more particularly to the embodiment of FIGURE 1, in which the actuation of the brake valve takes place either hydraulically or pneumatically, reference numeral 1 designates therein a conventional exhaust-gas line which is provided with a brake valve 2 rotatably supported in the exhaust gas line 1. A conventional working cylinder for the actuation of the brake valve 2 is designated in FIGURE 1 by reference numeral 3. The rod 4 of a piston 5 displaceably arranged in the working cylinder 3 thereby acts on a linkage 6 operatively connected with the brake valve 2. The pressure medium is supplied from a conventional valve 7, which is actuated by means of a contact 8, by way of a throttle 9 to the working cylinder 3 of the brake valve 2, on the one hand, and to the working cylinder 10 of the injection pump 11, on the other. The rod 12 of a piston 13 displaceably arranged in the working cylinder 10 of the injection pump 11 thereby acts on the control rack 14 serving the purpose of adjustment of the injection pump 11. The valve 7 is provided with a line 15 for the supply and with a line 16 for the exhaust of the pressure medium. The direction of flow of the pressure medium during actuation of the brake valve 2 is indicated in the drawing by the arrows. The throttle 9 which may be of any conventional adjustable construction is thereby so adjusted that the closing of the brake valve 2 is assured only after the turning off of the supply of the injection pump 11.

In the embodiment according to FIGURE 2, the pressure in the line 17 leading from the exhaust-gas turbo-supercharger (not shown) to the engine (not shown) is utilized for the control of the closure movement of the brake valve 2. This pressure acts on one side of a double-piston 20a, 20b arranged in a housing 18 and interconnected by a rod 19. The other side of the double piston 20a, 20b is acted upon by a compression spring 21. The connection of the two parts of the line sections 22a, 22b leading from the valve 7 to the working cylinder 3 of the brake valve 2, which terminate in the housing 18 offset relative to one another in the vertical direction, is established by the double piston 20a, 20b, acting as control slide valve, when the charging pressure in the line 17 has dropped or decreased to such an extent that the force of the compression spring 21 predominates with respect to the charging pressure and the double piston 20a, 20b is forced upwardly. It can be assured thereby in every case by an appropriate selection of the characteristics of the compression spring 21 that the brake valve 2 is closed only after the turning off of the supply of the injection pump 11.

In the embodiment illustrated in FIGURE 3 the closing of the brake valve 2 takes place in dependence on the position of the control rack 14 of the injection pump 11. A double piston 25a, 25b which is interconnected by a rod 24 and acts as control slide valve, is displaceably arranged in a housing 23. The double piston 25a, 25b is connected by means of a rod 26 extending out of the housing 23 with an extension 27 of the control rack 14.

In the position of the control rack 14 in which the supply of the injection pump 11 is turned off, the line sections 22a and 22b which terminate in the housing 23, are connected with each other by the double piston 25a, 25b and therewith the brake valve 2 is closed. Also with this arrangement the brake valve 2 can be closed only when the supply of the fuel injection pump 11 is turned off.

The control circuit schematically illustrated in FIGURE 4 for an electric actuation of the engine valve brake is provided with a switch 28, by means of which a current flow circuit is closed, on the one hand, by way of a relay 29 to the stroke magnet 30 which, by way of the control rack 14, turns off the supply of the injection pump 11, and on the other, by way of a conventional delay relay 31 to the stroke magnet 32 which closes the brake valve 2. A battery 33 serves as current supply source. By an appropriate construction of the response time of the delay relay 31, it can also be assured with this arrangement that the brake valve 2 is closed only after turning off the supply of the injection pump 11. Since delay relays which may be used for the relay 31 are well known in the art and are commercially available in different constructions a detailed description thereof is dispensed with herein.

While we have shown and described several embodiments in accordance with the present invention, it is understood that the same is not limited thereto but is susceptible of numerous changes and modifications as are known to a person skilled in the art. The present invention generally resides in installing or building into the actuating mechanism for the brake valve of an engine valve brake of an internal combustion engine which is equipped with an exhaust-gas turbo-supercharger, a delay element which assures that the brake valve can be closed only after complete turning off the supply of the injection pump. Thus, it is obvious that the present invention is susceptible of numerous changes and modifications as known to those skilled in the art, and we therefore do not wish to be limited to the details shown and described herein only for illustrative embodiments but intend to cover all such changes and modifications as are encompassed by the scope of the appended claims.

We claim:

1. An internal combustion engine, especially for motor vehicles, which is equipped with injection pump means, means to supply fluid to the pump means, means for turning off the supply of fluid to the pump means, exhaust-gas turbo-supercharger means, an exhaust gas duct operatively connected to supply exhaust gas to said turbo-charger means, an engine valve brake having brake valve means for closing to interrupt the flow of exhaust gas to said turbo-supercharger means, wherein the improvement comprises actuating means for the engine valve brake including delay means for delaying the closing of the brake valve means substantially until after the turning off of the supply of the injection pump means.

2. An internal combustion engine according to claim 1, wherein said actuating means utilizes a fluid pressure medium, and wherein said delay means includes throttle means for said pressure medium.

3. An internal combustion engine according to claim 1, wherein said actuating means includes a working cylinder and utilizes a pressure medium, said delay means including a housing, a double piston arranged in said housing, and said double piston opening up to the flow of the pressure medium, the line leading to the working cylinder of the brake valve means in dependence on the pressure in the line leading from the supercharger means to the internal combustion engine.

4. An internal combustion engine according to claim 1, in which said actuating means includes a working piston and utilizes a pressure medium, said delay means including a housing, a double piston arranged in said housing, said injection pump means including a control rack, and said double piston opening up to the flow of the pressure medium line leading to the working cylinder of the brake valve means in dependence on the piston of said control rack.

5. An internal combustion engine according to claim 1, wherein said actuating means is an electric actuating means, and wherein said delay means includes delay relay means.

6. An internal combustion engine according to claim 1, wherein said means for turning off the supply of fluid to the pump means is a first fluid operated expansible chamber device, and said brake valve actuating means includes a second fluid operated expansible chamber device for actuation thereof and a fluid throttle only upstream of said second fluid operated expansible chamber device constituting said delay means.

7. An internal combustion engine according to claim 1, wherein said means for turning off the supply of fluid to the pump means is a first fluid operated expansible chamber device, said brake valve actuating means including a second fluid operated expansible chamber device for actuation thereof and a common means for supplying actuating fluid to each of said fluid operated expansible chamber devices, said exhaust-gas turbo-supercharger means including an air line supplying supercharged air to said internal combustion engine, normally biased open valve means upstream of only said second fluid operated expansible chamber device and being acted upon by the pressure within said air line for closing against its bias only in response to pressure within said air line above a fixed predetermined pressure substantially above ambient pressure.

8. An internal combustion engine according to claim 1, wherein said means for turning off the supply of fluid to the pump means is a first fluid operated expansible chamber device, said brake valve actuating means including a second fluid operated expansible chamber device for actuation thereof, common means for selectively supplying pressurized actuating fluid to both of said expansible chamber devices, valve means upstream of only said second expansible chamber device and being operative to open only in response to movement of said means for turning off the supply of fluid to the pump means.

9. An internal combustion engine according to claim 1, wherein said means for turning off the supply of fluid to the pump means includes a first electromagnet, said brake valve actuating means includes a second electro-magnet in parallel circuit with said first electromagnet, said delay means being electric and in series only with said first electromagnet.

References Cited

UNITED STATES PATENTS

| | | | |
|---|---|---|---|
| 2,168,232 | 8/1939 | Messinger | 123—97 |
| 2,947,392 | 8/1960 | Heine | 123—97 |
| 3,185,140 | 5/1965 | Cummins | 123—97 |
| 3,270,724 | 9/1966 | Dolza | 60—13 |

MARTIN P. SCHWADRON, *Primary Examiner.*

DOUGLAS HART, *Assistant Examiner.*

U.S. Cl. X.R.

123—97